(12) United States Patent
Scearce

(10) Patent No.: US 6,983,675 B2
(45) Date of Patent: Jan. 10, 2006

(54) LIGHT BULB BASE EXTRACTOR

(76) Inventor: Thomas R. Scearce, 138 Third St., South Fulton, TN (US) 38257

( * ) Notice: Subject to any disclaimer, the term of this patent is extended or adjusted under 35 U.S.C. 154(b) by 0 days.

(21) Appl. No.: 10/764,766

(22) Filed: Jan. 26, 2004

(65) Prior Publication Data

US 2005/0160879 A1    Jul. 28, 2005

(51) Int. Cl.
*B25B 23/16*    (2006.01)
(52) U.S. Cl. .................. 81/53.1; 81/53.11; 81/53.12
(58) Field of Classification Search ............. 81/15.1, 81/15.11, 15.12, 53.1, 53.11, 53.12
See application file for complete search history.

(56) References Cited

U.S. PATENT DOCUMENTS

| | | | |
|---|---|---|---|
| 1,288,873 A * | 12/1918 | Grinnell | .................. 81/53.11 |
| 1,319,028 A | 10/1919 | Grinnell | |
| 2,117,017 A | 5/1938 | Chadsey | |
| 2,516,650 A | 7/1950 | Shapiro et al. | |
| 4,086,799 A * | 5/1978 | Brendle | ..................... 72/114 |
| 4,325,276 A * | 4/1982 | Jordan | ........................ 81/441 |
| 4,485,701 A | 12/1984 | Hough | |
| 5,103,695 A | 4/1992 | Dolle et al. | |
| 5,371,658 A | 12/1994 | Christie | |
| 5,386,744 A | 2/1995 | Garcia | |
| 5,490,438 A | 2/1996 | Zupo et al. | |
| 5,829,324 A | 11/1998 | Secor | |
| 5,937,714 A | 8/1999 | Sherman et al. | |
| 6,223,628 B1 | 5/2001 | Barron | |
| 6,260,442 B1 * | 7/2001 | Bayat | ........................ 81/53.11 |
| 6,450,745 B2 * | 9/2002 | Wieser | ........................ 411/58 |

* cited by examiner

*Primary Examiner*—Lee D. Wilson
*Assistant Examiner*—Alvin J. Grant
(74) *Attorney, Agent, or Firm*—Wayne Edward Ramage

(57) ABSTRACT

A device for the extraction of the base of a broken light bulb from the socket without further breakage of any remaining glass or deformation of the bulb base member or the socket. A hollow elongated conical cylinder with a series of slots or slits at the apex of the cone is inserted into a light bulb base. A threaded cylindrical rod is screwed into threads inside the conical cylinder, causing the apex of the cone to expand and engage the inside of the light bulb base. When securely engaged, the entire device is turned to cause the light bulb base to be come disengaged from the light socket.

10 Claims, 3 Drawing Sheets

LIGHT BULB BASE EXTRACTOR

TECHNICAL FIELD

This invention relates generally to a device for removing the base of a broken light bulb from a socket.

BACKGROUND OF THE INVENTION

The use of a variety of devices for extracting the base of a broken light bulb from a socket is well known in the prior art. Various configurations of prior art devices are known, but the basic configuration has a substantially rigid member which forcibly engages or grips the remaining glass portion or the metal base member of the bulb. These prior art tools often result in further breakage of any remaining glass, and in deformation of the bulb base structure. Such tools also can cause deformation or damage to the socket itself.

Accordingly, there is a continuing need for an improved device for the extraction of broken light bulb bases. The present invention provides an apparatus developed for the purpose of removing the base of a broken light bulb from the socket without further breakage of any remaining glass or deformation of the bulb base member or the socket.

SUMMARY OF THE INVENTION

An object of the present invention is a device for extracting the base of a broken light bulb from a socket without further breakage of any remaining glass or deformation of the bulb base member or the socket.

Accordingly, the present invention generally comprises a hollow elongated conical cylinder with a series of slots or slits extending from the narrower apex end of the cone. The interior of the conical cylinder is threaded at least in part, and a cylindrical rod with matching threads is located in the interior of the conical cylinder with a handle end extending out through the wider base end of the cone. The apex end of the conical cylinder is placed inside the base of the broken light bulb, and the threaded cylindrical rod is screwed into the conical cylinder, thereby causing the apex end to expand and engage the inside of the base of the broken light bulb. The entire device is then turned in the appropriate direction, typically counterclockwise, causing the base to become disengaged from the socket.

In accordance with another embodiment of the present invention, the exterior of the apex end of the conical cylinder is fashioned from a type of plastic or other material designed to more easily engage the inside of the base of the broken light bulb.

Still other advantages of various embodiments will become apparent to those skilled in this art from the following description wherein there is shown and described exemplary embodiments of this invention simply for the purposes of illustration. As will be realized, the invention is capable of other different aspects and embodiments without departing from the scope of the invention. Accordingly, the advantages, drawings, and descriptions are illustrative in nature and not restrictive in nature.

DESCRIPTION OF EXEMPLARY EMBODIMENTS

Figure 1:
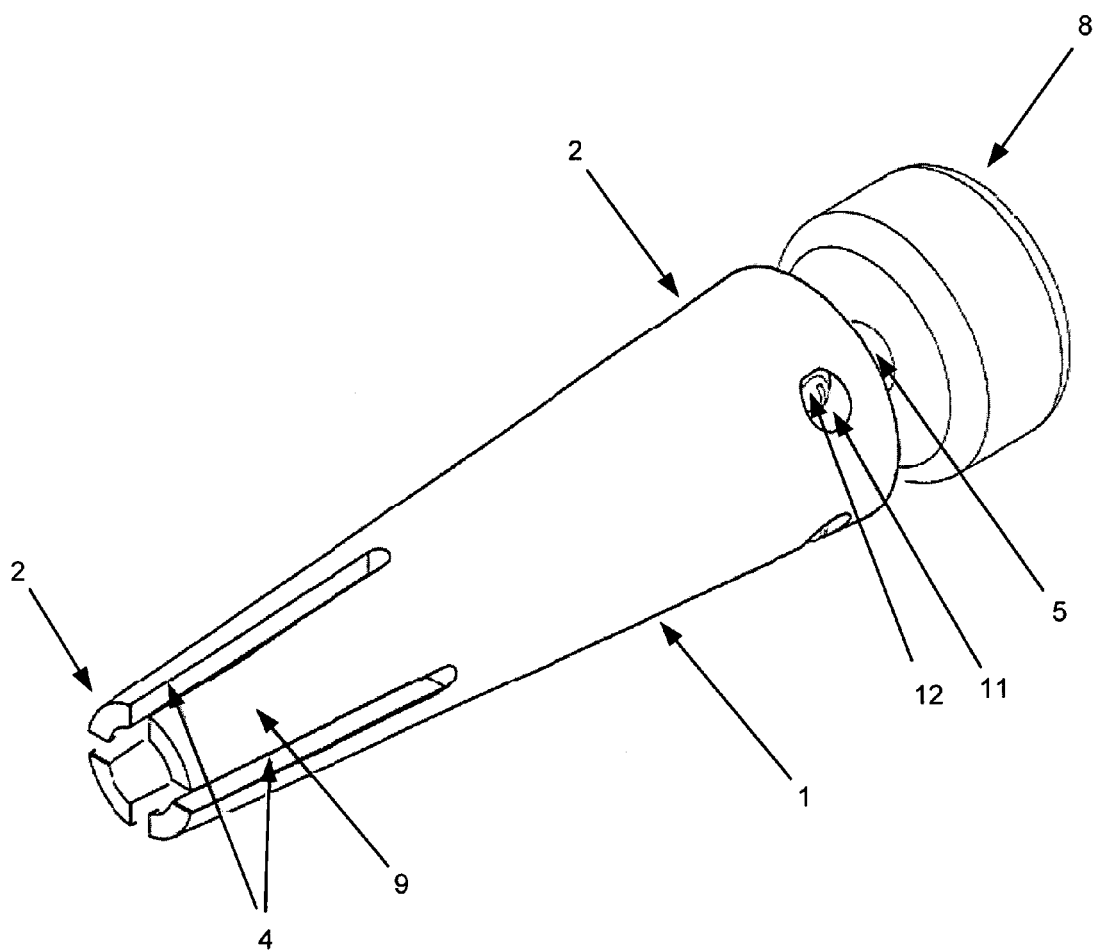
FIG. 1 shows a perspective view of one embodiment of a device in accordance with the invention.
Figure 2:
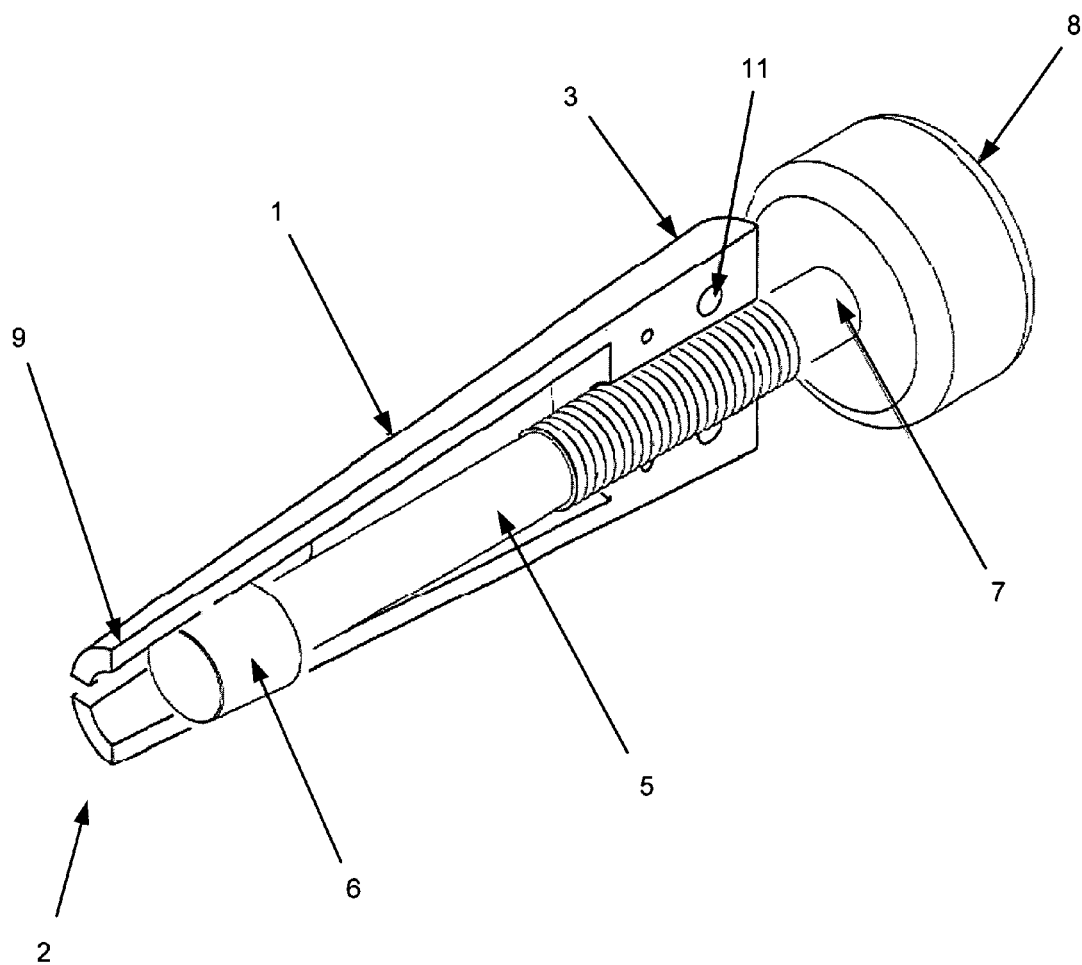
FIG. 2 shows a perspective cut-away view of the device of FIG. 1.
Figure 3:
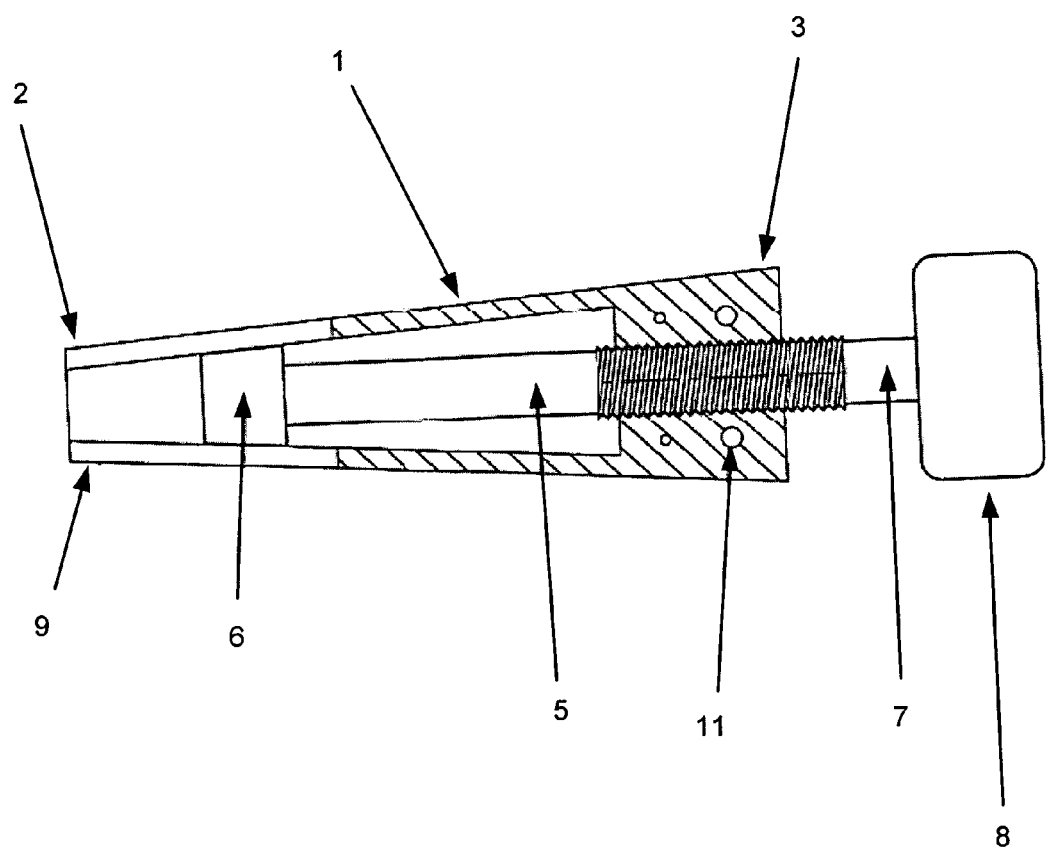
FIG. 3 shows a side cut-away view of the device of FIG. 1.

As shown in FIGS. 1, 2, and 3 a first embodiment of a device according to this invention includes a hollow elongated conical cylinder 1 with a narrower apex end 2 and an opposing wider base end 3. Two or more slits or slots 4 extend from the apex end 2 length-wise along the conical cylinder 1 for a portion of its length. As shown in FIG. 2, the diameter of the interior of the conical cylinder 1 can be variable, and the interior of the conical cylinder 1 is threaded at least partially, typically near the base end 3. A cylindrical rod 5 is located in the interior of the conical cylinder 1, with an insertion end 6 inside the conical cylinder and an opposing handle end 7 extending out through the base end 3. The cylindrical rod 5 is threaded for at least a portion of its length to match the threads on the interior of the conical cylinder 1. The insertion end 6 is moved longitudinally inside the conical cylinder 1 by screwing the rod 5 into or out of the conical cylinder 1 through rotation of the handle end 7.

As shown in FIGS. 2 and 3, the insertion end 6 of the rod 5 can be of larger diameter than the remaining section of the rod 5. The insertion end 6 can also be of variable diameter to match the interior diameter of a section of the conical cylinder 1. A knob 8 also may be affixed to the handle end 7 of the rod 5 for ease of use.

The base engaging portion 9 of the conical cylinder 1 consists of the exterior of the apex end 2. The base engaging portion 9 is inserted into the base of the broken light bulb (not shown), and the rod 5 is screwed into the conical cylinder 1, pushing the insertion end 6 of the rod 5 against the interior of the apex end 2 of the conical cylinder 1, and causing the apex end 2 to expand until the base engaging portion 9 firmly engages the interior of the light bulb base. The conical cylinder 1 is then rotated, typically in a counterclockwise direction, to remove the light bulb base from the socket (not shown).

In one exemplary embodiment, the conical cylinder 1 is fashioned of some substantially rigid non-conducting material such as plastic. The rod 5 may also be fashioned from the same material.

In another exemplary embodiment, the base engaging portion 9 is fashioned of a softer, more pliable non-conducting material or plastic to enhance the ability of the base engaging portion 9 to engage the inside of the light bulb base (not shown). The base engaging portion 9 may also comprise a separate piece of such material affixed to the outside of the apex end 2 of the conical cylinder 1.

While the conical cylinder 1 can be of unitary construction, it can also be fashioned in two or more pieces. These pieces can then be fastened together by one or more bolts, screws, or similar means. In one exemplary embodiment, as shown in FIGS. 1 and 2, the conical cylinder 1 is fashioned from two substantially mirror-image pieces, with two or more holes 11 placed in the base end 3 of one or both of the conical cylinder 1 pieces to allow the pieces to be fastened by one or more screws 12.

Thus, it should be understood that the embodiments and examples have been chosen and described in order to best illustrate the principals of the invention and its practical applications to thereby enable one of ordinary skill in the art to best utilize the invention in various embodiments and with various modifications as are suited for the particular uses contemplated. Even though specific embodiments of this invention have been described, they are not to be taken as exhaustive. There are several variations that will be apparent to those skilled in the art. Accordingly, it is intended that the scope of the invention be defined by the claims appended hereto.

I claim:

1. A device for the extraction of broken light bulb bases, comprising:
   an elongated hollow conical cylinder with a narrow apex end and a wide base end, the interior of the conical cylinder having threads for at least a portion of its length nearest the base end;
   two or more slits extending from the apex end length-wise along the conical cylinder; and
   a cylindrical rod with an insertion end placed inside the conical cylinder and an opposing handle end extending from the base end of the conical cylinder, the exterior of the rod having threads for at least a portion of its length to match the threads on the interior of the conical cylinder.

2. The device of claim 1, wherein a knob is affixed to the handle end of the rod.

3. The device of claim 1, wherein the exterior of the apex end of the conical cylinder comprises a base engaging portion adapted to engage the interior of a light bulb base.

4. The device of claim 3, wherein the base engaging portion is fashioned from a pliable material to enhance engagement with the interior of the light bulb base.

5. The device of claim 1, wherein the conical cylinder is fashioned of a substantially rigid non-conducting material.

6. The device of claim 5, wherein the substantially rigid non-conducting material is plastic.

7. The device of claim 1, wherein the interior of the conical cylinder is of variable diameter.

8. The device of claim 1, wherein the threads on the exterior of the rod are located on the portion of the rod nearest the handle end.

9. A device for the extraction of broken light bulb bases, comprising:
   an elongated hollow conical cylinder with a narrow apex end and a wide base end, the interior of the conical cylinder having threads for at least a portion of its length;
   two or more slits extending from the apex end length-wise along the conical cylinder; and
   a cylindrical rod with an insertion end placed inside the conical cylinder and an opposing handle end extending from the base end of the conical cylinder, the exterior of the rod having threads for at least a portion of its length to match the threads on the interior of the conical cylinder, and further wherein the insertion end of the rod is of larger diameter than the remaining section of the rod.

10. The device of claim 9, wherein the insertion end of the rod has a variable diameter.

* * * * *